Patented Sept. 28, 1926.

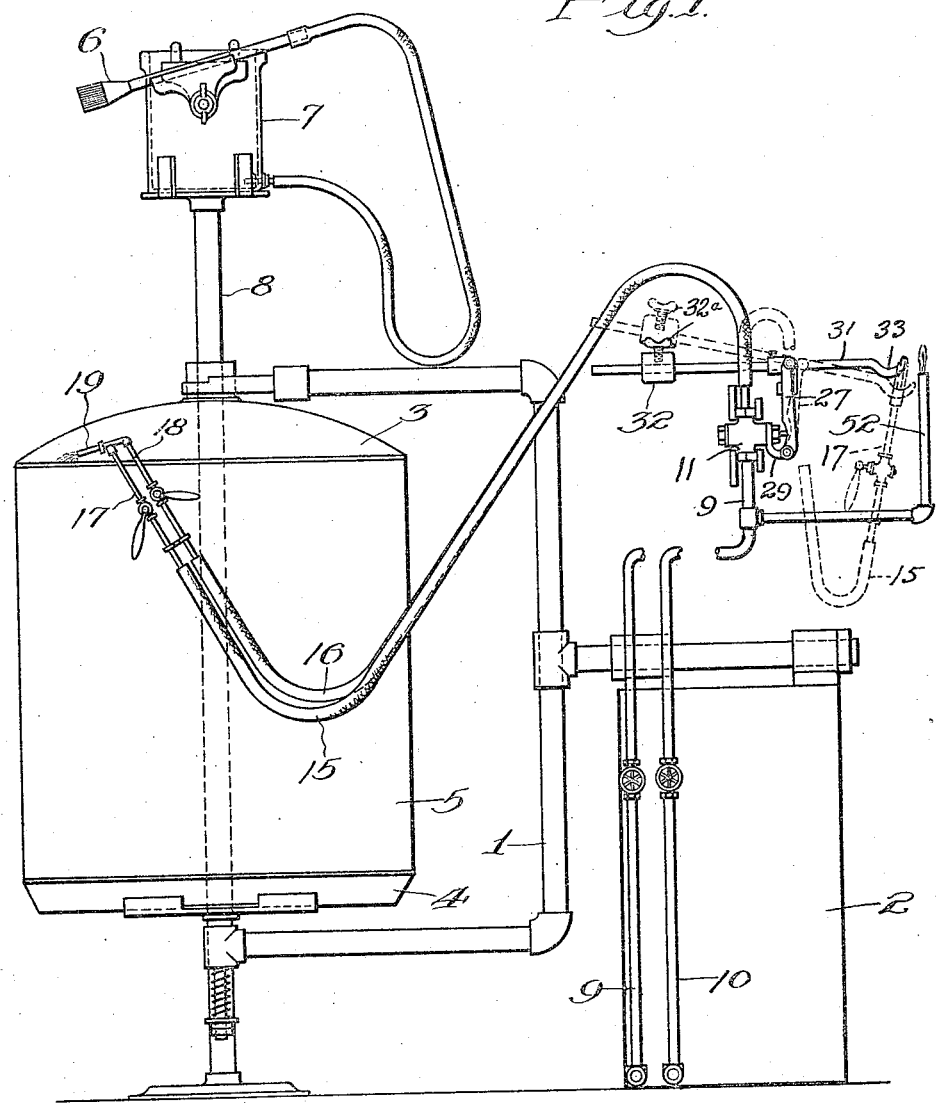

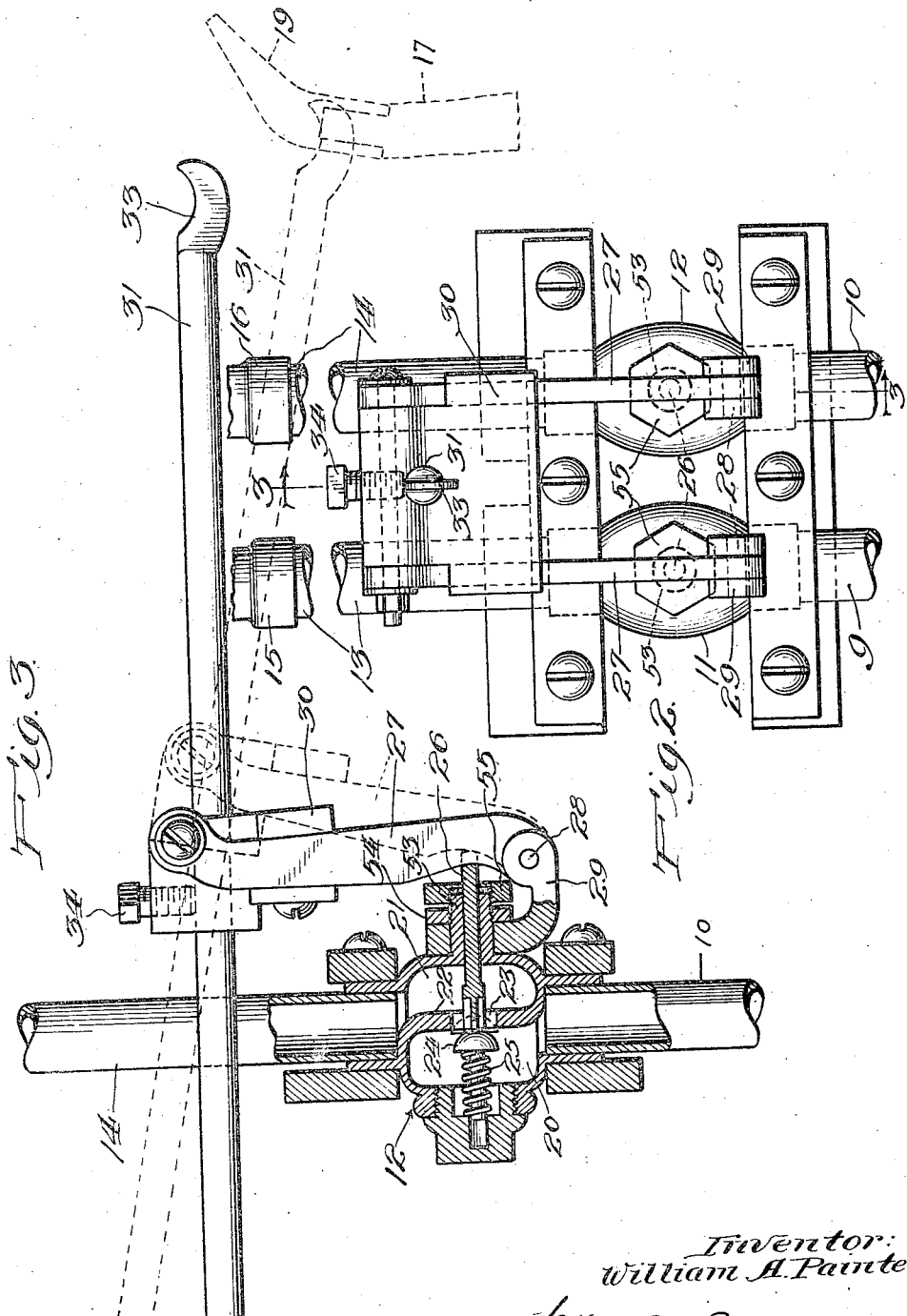

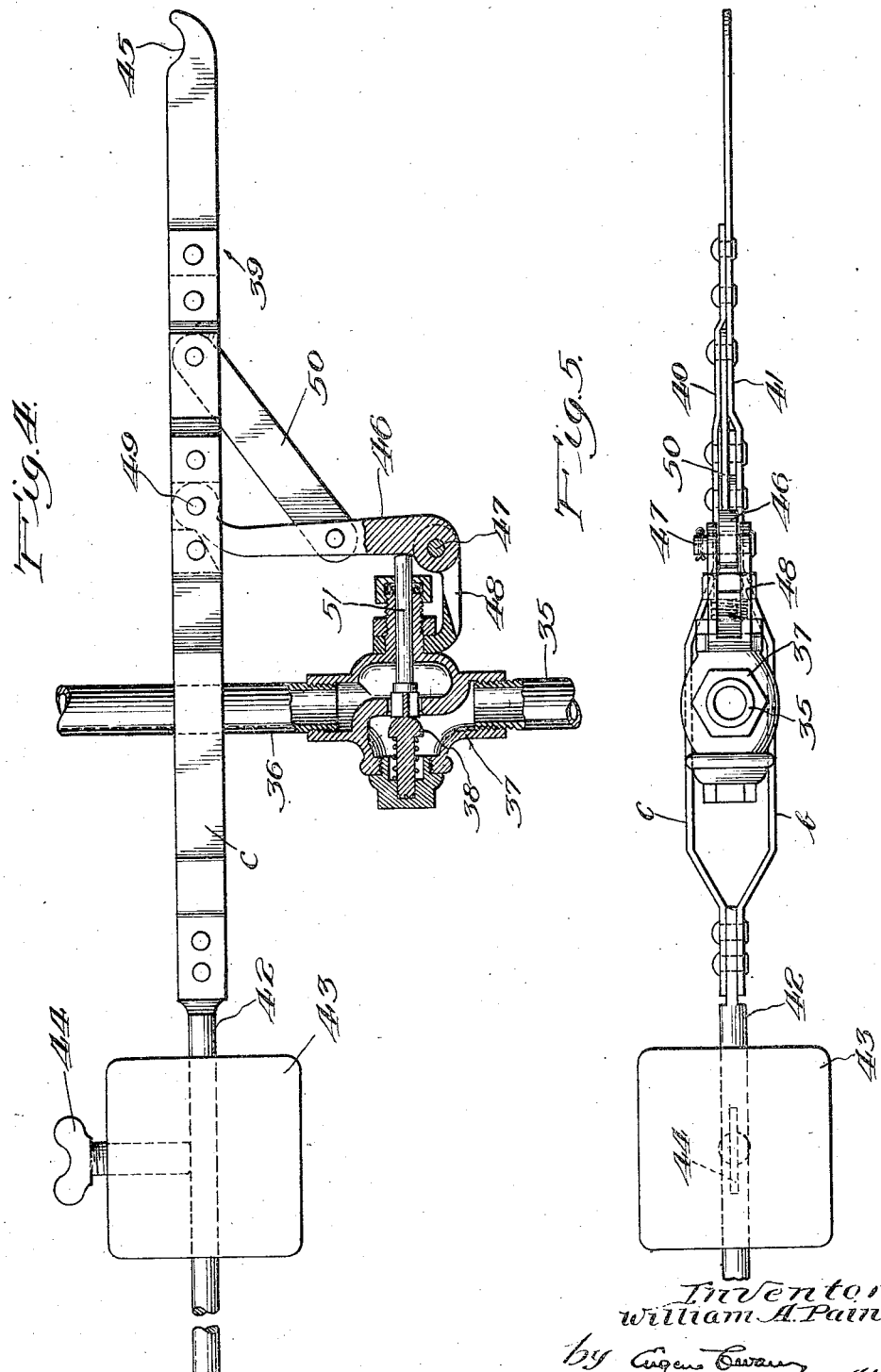

1,600,993

UNITED STATES PATENT OFFICE.

WILLIAM A. PAINTER, OF DETROIT, MICHIGAN, ASSIGNOR TO McCORD RADIATOR & MFG. CO., OF DETROIT, MICHIGAN, A CORPORATION OF MAINE.

VALVE FIXTURE FOR BLOWTORCHES.

Application filed October 20, 1924. Serial No. 744,697.

This invention relates to valve devices for controlling the supply of gas and air to blow torches, such as are used in soldering operations.

One object of the invention is to provide a valve device which when hanging up the torch, when not in use, will by the weight of the torch automatically shut off the supply of gas and air to the torch and thus prevent burning of the torch and wasting of the fuel when the torch is not in use.

My invention is particularly advantageous in connection with soldering equipment used for making motor vehicle radiators, as the gas and air supply used by the torch is entirely cut off and thereby saved during the times when the operator is not engaged in using the torch, as when handling the radiator assembly and lifting it in and out of the soldering frame and when applying soldering flux to the portions to be soldered.

The invention consists further in the matters hereinafter described and claimed.

In the accompanying drawings—

Fig. 1 is an elevational view of a soldering equipment, including a shut-off valve fixture of my invention;

Fig. 2 is a front view of the valve fixture and torch supporting rod;

Fig. 3 is a view partly in section and partly in elevation taken on the indirect line 3—3 of Fig. 2;

Fig. 4 is a side elevational view with parts in section of a fixture for a single valve instead of a double valve as in the foregoing figures; and Fig. 5 is a bottom plan view of the parts shown in Fig. 4.

In Fig. 1, the soldering equipment includes a frame 1 carried by a suitable support 2 and constructed to hold a core and tank assembly of a radiator during soldering of the upper and lower tanks 3, 4 to the interposed core 5. Flux is applied to the parts to be soldered by a fountain brush 6, supported when not in use on the flux container 7 at the upper end of an upright stand 8. The fountain brush assembly constitutes the subject-matter of my copending application, filed October 20, 1924, Serial No. 744,694.

Adjacent the stand 1 are two upright pipes 9, 10, one for air and the other for gas. These pipes terminate in valve housings or casings 11, 12, one for each pipe, as clearly shown in Fig. 2. The valve housings are connected with pipes 13, 14, which extend above them and to which are connected flexible rubber tubes 15, 16 as shown in Figs. 1 and 3. These tubes are connected at their outer ends to the two pipes 17, 18, of a blow torch and supply gas and air to the burner nozzle 19, as shown in Fig. 1.

As shown in Fig. 3, each valve housing 11, 12 is divided into two chambers 20, 21 by an interposed vertical partition wall 22 having a port 23 for communicating the chambers. The chamber 20 is open to the associated pipe 9 or 10, as the case may be, and has in it a valve member 24 for controlling the passage of fluid from chamber 20 to chamber 21 and the pipe connected with the latter. This valve is closed by a spring 25 and has a stem 26 extending out through the front side of the valve casing.

In front of the valve housings 11, 12 are arms 27, 27, one for each valve housing and bearing against the outer ends of the valve stems 26, as shown in the drawings. The lower ends of the arms 27 are pivoted by pins 28 to brackets 29, 29 fixed in any suitable manner to their respective valve housings. The upper ends of the arms 27, 27 carry between them a block 30, through which extends a rod 31 carrying at its rear end an adjustable counter-weight 32, as shown in Fig. 1. The outer end of the rod is provided with a hook-shaped portion 33 so as to pass between the pipes 17, 18 of the blow torch and engage under the nozzle pipe 19 when the blow torch is hung on said rod, as shown in dotted lines in Figs. 1 and 3. The rod is adjustably clamped to the block 30 by a set-screw 34.

The counter-weight 32 is adjusted on the rod 31 by a set screw 32$^a$ to hold the rod in a substantially horizontal position, as shown in Fig. 3, and keep the valve 24 open when the torch is off the rod. At such time air and gas are supplied to the torch and there ignited for use during the soldering operation. When the soldering step has been completed, the operator hangs the torch over the hooked end 33 of the rod and the weight of the torch is sufficient to overbalance that of the weight 32 and swings the arms and rod about the pivot pins 28 into the downwardly inclined position shown by dotted lines in Figs. 1 and 3, thereby allowing the springs 25 to close the valves 24 and shut off the supply of air and gas to the torch, the latter thus becoming extinguished and not wasting any fuel during the time that the torch is not in use. This automatic shut off of the valve saves soldering cost because gas is not being burned during the time that the operator is not using the torch, as for instance when placing the core assembly in the frame 1, applying flux to the parts to be soldered, and when removing the core assembly from the frame after being soldered. This automatic valve cut-off effects a saving of many dollars' worth of gas in a radiator plant and thus cuts down the operating expense of soldering the radiators.

When the torch is lifted off the rod 31, the weight 32 swings the rod back into its horizontal position, causing the arms 27 to move in against the valve stems 26 and open the valves and supply gas and air to the torch.

As shown in Fig. 1, I provide a pilot burner 52 having its lighted end adjacent the hooked end of the rod 31, so as to automatically light the torch when it is lifted up from the rod. The same arrangement could be employed with the single torch fitting shown in Figs. 4 and 5.

When a single blow torch is used, as distinguished from a double one, air and gas are supplied in the form of a mixture to the torch, the mixture taking place in advance of the torch nozzle. The structure shown in Figs. 4 and 5 is used for such a torch. In these figures, 35 indicates the inlet pipe for the gas and air mixture; 36, the outlet pipe to which the torch is connected by rubber tubing, and 37, the valve housing. A spring controlled, self closing valve 38 is in the housing 37 and operates in the same general manner as the valve 24 in the preceding figures. A rod 39 for supporting the torch is made in two longitudinal parts 40, 41 having bent or offset sections b, c between their ends to pass around the pipe 36. The sections are riveted or otherwise secured together adjacent their front and rear ends, and carry at their rear end a rod 42 carrying an adjustable counter-weight 43 with a set-screw 44, as shown. The other end of the rod is formed with a hook 45 to receive the blow torch when hung on the rod.

A vertical arm 46, by a pin 47, is pivoted at its lower end to a bracket 48 carried by the valve housing 37. The upper end of this arm 46 extends between the two parts of the rod 39 and is fixed thereto as at 49. In order that the rod 39 will not pivot with respect to the arm 46, I provide a brace 50 extending between the arm and the rod, as shown.

When a single torch is hung on the hooked end 45 of the rod 39, the weight of the torch overbalances that of the counter-weight 43 and the entire rod swings into inclined position about the pivot pin 47 of the arm 46, thereby carrying the arm away from the outer end of the valve stem 51 and allowing the valve to close automatically to cut off the fuel supply to the torch. When the torch is lifted from the hook 45, the counter-weight 43 carries the rod 49 back into its horizontal position, shown in Fig. 4, and moves the valve 38 off its seat to supply fuel to the torch.

As shown in Fig. 3, the bracket 29 is mounted on a boss 53 on the valve casing 12 and held thereon by a clamp nut 54. A gland nut 55 with packing is applied to the boss in front of the nut 54, as shown, to prevent leakage from the valve casing around the valve stem 26. A similar fastening arrangement is employed for the bracket 48, as shown in Fig. 4.

The valve device of Figs. 1 to 3 includes two valve means, while only one of such means is required in Figs. 4 and 5. Both valve devices control the supply of gas and air to the blow torch and are operated by hanging the torch on and lifting it from the depressible rods.

While I have shown and described herein in detail the shut-off valve devices for blow torches, it is of course to be understood that the details of structure and arrangement of parts may be variously changed and modified without departing from the spirit and scope of my invention.

I claim as my invention:

1. The combination with a valve device having a valve with a stem, of a blow torch flexibly connected with said valve device, an arm pivoted to said valve device and engaging said stem, and a rod carried by said arm and having a weight at one end of the same, said arm moving outward from the stem to allow the valve to close when the torch is hung on the other end of said rod, said arm moving the stem inward to open the valve by the weight on the rod when the torch is lifted from the rod.

2. The combination with two valve means for gas and air, respectively, and each having a valve with a stem, of a blow torch flexibly connected with both valve means, arms pivoted to said valve means, one for each stem and engaged therewith, a block at the upper end of the arms and carried between the same, a rod carried by said block and being weighted at one end, said arms moving outward from the stems to allow both valves to close when the torch is hung on the other end of said rod, said arms moving the stems inward by the weight on the rod to open both valves on lifting the torch from said rod.

3. The combination with two valve means for gas and air, respectively, and each having a valve with a stem, of a blow torch flexibly connected with both valve means, arms pivoted to said valve means, one for each stem and engaged therewith, a block at the upper ends of the arms and carried between the same, a rod extending through said block and adjustably clamped therein and being weighted at one end, said arms moving outward from the stems to allow both valves to close when the torch is hung on the other end of said rod, said arms moving the stems inward by the weight on the rod to open both valves on lifting the torch from said rod.

4. The combination with a single valve device for mixed air and gas and having a valve with a stem, of a blow torch flexibly connected with said valve device, an arm pivoted to the valve device and engaging said stem, a rod carried by said arm and weighted at one end, and a brace between the rod and arm on the side of the latter opposite the weight to cause the rod to swing with the arm when actuated by hanging the torch on and lifting it from the other end of said rod in opening and closing said valve.

In testimony that I claim the foregoing as my invention, I affix my signature, this 4th day of October, 1924.

WILLIAM A. PAINTER.